(12) United States Patent
Shibata

(10) Patent No.: US 8,355,733 B2
(45) Date of Patent: Jan. 15, 2013

(54) RADIO COMMUNICATION SYSTEM

(75) Inventor: Manabu Shibata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 847 days.

(21) Appl. No.: 12/236,665

(22) Filed: Sep. 24, 2008

(65) Prior Publication Data

US 2009/0191881 A1    Jul. 30, 2009

(30) Foreign Application Priority Data

Jan. 28, 2008   (JP) .................................. 2008-16324

(51) Int. Cl.
*H04W 40/00*   (2009.01)

(52) U.S. Cl. ........................................................ 455/446

(58) Field of Classification Search ................... 455/446
See application file for complete search history.

(56) References Cited

U.S. PATENT DOCUMENTS

| | | | |
|---|---|---|---|
| 4,376,310 A * | 3/1983 | Stackhouse et al. ........... | 375/351 |
| 5,504,937 A | 4/1996 | Kangas | |
| 5,574,971 A | 11/1996 | Aihara | |
| 6,282,425 B1 | 8/2001 | Hottinen | |
| 6,507,741 B1 * | 1/2003 | Bassirat ........................ | 455/440 |
| 6,615,030 B1 * | 9/2003 | Saito et al. .................... | 455/296 |
| 6,888,805 B2 * | 5/2005 | Bender et al. ................. | 370/314 |
| RE42,326 E * | 5/2011 | Hasegawa ...................... | 455/512 |
| 2002/0155838 A1 * | 10/2002 | Durrant et al. ................. | 455/445 |
| 2003/0123401 A1 * | 7/2003 | Dean .............................. | 370/318 |
| 2005/0221815 A1 | 10/2005 | Okabe | |
| 2006/0046644 A1 * | 3/2006 | Chung et al. .................. | 455/11.1 |
| 2006/0073837 A1 | 4/2006 | Tanaka et al. | |
| 2008/0287130 A1 * | 11/2008 | Laroia et al. ................... | 455/436 |

FOREIGN PATENT DOCUMENTS

| | | |
|---|---|---|
| JP | 7-274233 | 10/1995 |
| JP | 11-32080 | 2/1999 |
| JP | 11-136742 | 5/1999 |
| JP | 2000-333257 | 11/2000 |
| JP | 2005-294972 | 10/2005 |
| JP | 2006-87019 | 3/2006 |
| JP | 2006-197264 | 7/2006 |

OTHER PUBLICATIONS

Notification of Reasons for Rejection dated Jan. 24, 2012, from corresponding Japanese Application No. 2008-016324.

* cited by examiner

*Primary Examiner* — Nathan Mitchell
(74) *Attorney, Agent, or Firm* — Katten Muchin Rosenman LLP

(57) ABSTRACT

A radio communication system, preventing communication disconnection when a communication failure occurs in a base station, is provided. The radio communication system includes a common base station (BTS-C) communicable with each communication area of the plurality of BTS (FIG. 1A), in addition to a plurality of base stations (BTS) each located in each communication area. In place of a base station BTS which becomes a communication impossible state with a terminal in the communication area, the BTS-C communicates with the terminal MS in the communication area concerned.

10 Claims, 10 Drawing Sheets

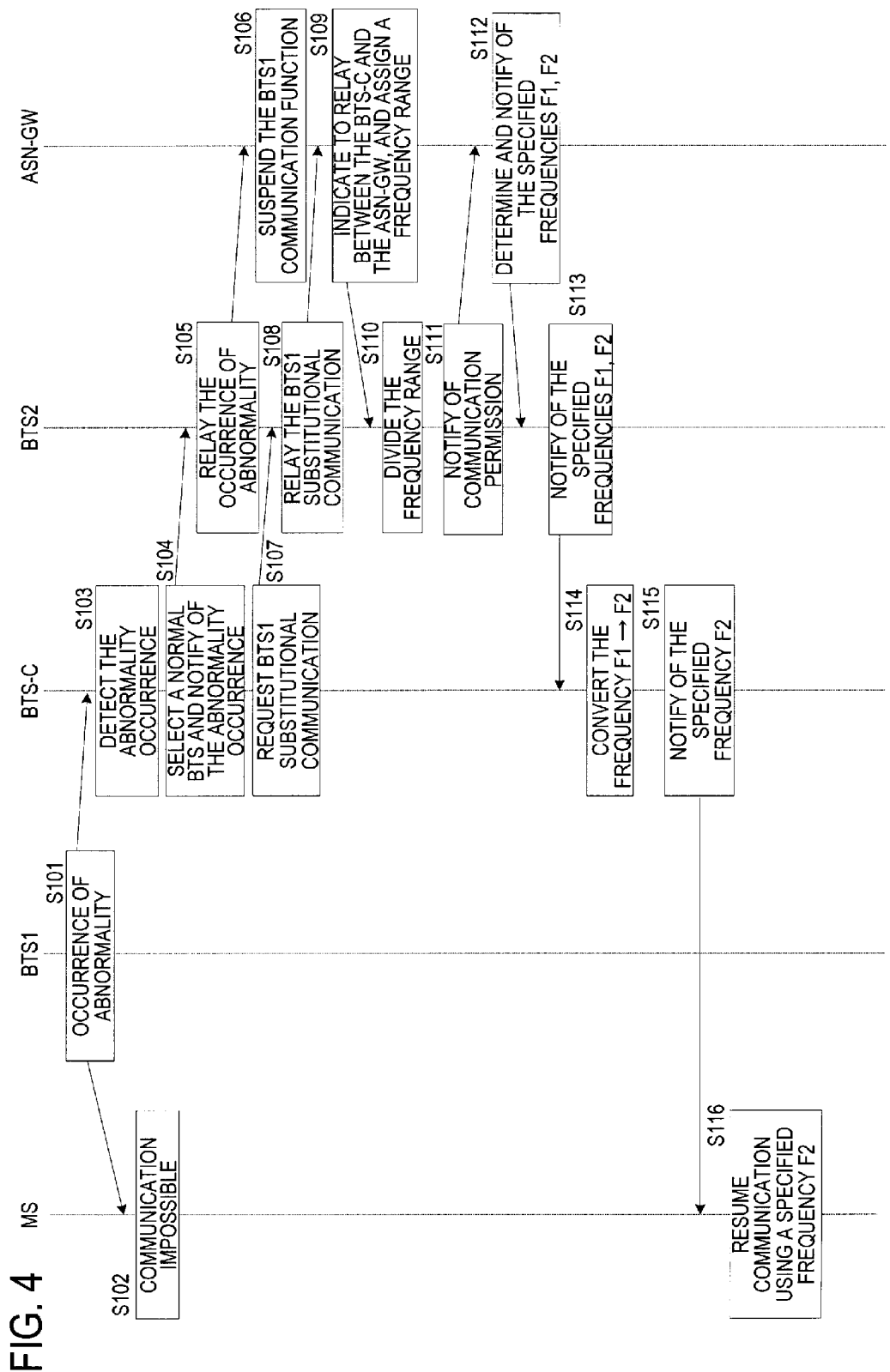

RADIO COMMUNICATION SYSTEM

CROSS-REFERENCE TO RELATED APPLICATIONS

This application is based upon and claims the benefit of priority from the prior Japanese Patent Application No. 2008-016324, filed on Jan. 28, 2008, the entire contents of which are incorporated herein by reference.

BACKGROUND OF THE INVENTION

1. Field of the Invention

The present invention relates to a radio communication system having a plurality of base stations each located in each communication area, and more particularly a radio communication system communicating between the base stations having adjacent areas, using frequencies which are not mutually overlapped.

2. Description of the Related Art

As a measure for avoiding a communication failure due to a trouble in a base station constituting the radio communication system, for example, there has been adopted a redundant configuration, such as a duplicated structure, in the equipment configuration of each base station.

When the equipment has duplicated structure, it is necessary to prepare the equipment with hardware and software which realize an identical function in a duplicated manner. This produces an increase of an equipment scale with a complicated equipment configuration, such that processing to share data on the active side and the standby side becomes necessary.

Meanwhile, even when the equipment in the base station is configured of duplicated structure, unless a power unit to supply power to the base station is not duplicated, or a preferential communication path to an upper-level unit is not duplicated, the communication function of the base station itself goes down in the event of a failure in the above units, and communication in the base station communication area becomes impossible. Therefore, in consideration of the occurrence of failure in the communication function of a certain base station, it is necessary to secure a substitutional communication function.

In the cited Patent document 1, there is proposed a method of transferring a stored voice data to the opposite party via a data relay unit in place of a base station, on detecting abnormal speech communication in a mobile telephone network.

[Patent document 1] the official gazette of the Japanese Unexamined Patent Publication No. 2005-294972.

However, according to the method proposed in the cited patent document 1, when the speech communication is abnormally terminated, a message recorded thereafter is transmitted to the opposite communication terminal by use of a communication network different from the mobile telephone network. It is not possible to prevent the disconnection of the communication itself.

In order to prevent communication disconnection even when a communication failure occurs in the base station, it is considered to introduce a redundant configuration to the entire functions necessary for securing communication, such as in the power unit and the communication path to/from the upper-level equipment, in addition to the duplication of the equipment configuration in the base station. However, the above method is not realistic because of requiring a large cost to implement such the system.

SUMMARY OF THE INVENTION

Accordingly, the objective of the present invention is to provide a radio communication system, preventing communication disconnection when a communication failure occurs in a base station.

A first structure of a radio communication system according to the present invention is provided that a first base station having a first communication area, and performing radio communication with a first terminal in the first communication area using a first frequency band, a second base station having a second communication area adjacent to the first communication area, and performing radio communication with a second terminal in the second communication area using a second frequency band different from the first frequency band, and a common base station capable of radio communication with the first base station, the second base station, the first terminal and the second terminal, wherein the common base station receives a radio output signal from the first base station and the second base station, and supervises the existence or non-existence of abnormality in the first base station and the second base station based on the receiving condition of the output signal, and on detecting abnormality causing communication impossibility between the first base station and the first terminal, the common base station performs radio communication with the first terminal using the first frequency band.

Even when the overall base station falls into a communication impossible condition, a communication interruption can be avoided by switching over to substitutional communication using the common base station. By providing one common base station to the plurality of base stations, the overall system cost can be reduced.

Further, a second structure of the radio communication system according to the first structure is provided that an upper-level unit connected by wire with the first base station and the second base station is included, wherein the common base station performs radio communication with the second base station, using a frequency in the first frequency band, being different from the frequency for terminal communication provided for communicating with the first terminal, and wherein the second base station relays a signal, which is to be transmitted from the common base station and destined to the upper-level unit, to the upper-level unit, and also relays a signal, which is to be transmitted from the upper-level unit and destined to the common base station, to the common base station.

Even when the common base station is not connected by wire to the upper-level unit, by utilizing the second base station, which is normally working, as a relay base station, the common base station can communicate with the upper-level unit via the second base station.

A third structure of the radio communication system according to the second structure 2, is provided that the common base station converts a signal received from the second base station using the different frequency into a signal having the frequency for terminal communication, so as to transmit to the terminal, and also converts a signal received from the terminal using the frequency for terminal communication, so as to transmit to the second base station.

A fourth structure of the radio communication system according to the first structure is provided that an upper-level unit connected by wire to the first base station, the second base station and the common base station is included.

A fifth structure of the radio communication system according to the first structure is provided that the common base station includes an antenna having directivity in an output signal, and when performing radio communication with the first terminal, outputs a signal having stronger directivity to the direction of the first terminal than to other directions.

A sixth structure of the radio communication system according to the first structure is provided that the common base station includes an antenna for performing radio communication with at least the first terminal in the first communication area and the second terminal in the second communication area, and an antenna for communicating with the second base station, and the second base station includes an antenna for performing radio communication with at least the second terminal in the second communication area, and an antenna for communicating with the common base station.

A seventh structure of the radio communication system according to the first structure is provided that on receiving a signal from the second base station to the second terminal using the frequency for terminal communication in the second frequency band, the common base station converts the signal into a frequency in the second frequency band, which is different from the frequency for terminal communication, so as to transmit to the second terminal, and the second terminal performs synthesis processing of the signal from the second base station, having the frequency for terminal communication, with the signal from the common base station having the different frequency.

An eighth structure of the radio communication system includes a first base station having a first communication area, and performing radio communication with a first terminal in the first communication area using a first frequency band, a second base station having a second communication area adjacent to the first communication area, and performing radio communication with a second terminal in the second communication area, using a second frequency band different from the first frequency band, and a common base station capable of radio communication with the first base station, the second base station, the first terminal and the second terminal, wherein, on receiving a signal from the first base station destined to the first terminal using the frequency for terminal communication in the first frequency band, the common base station converts the signal to a frequency different from the frequency for terminal communication in the first frequency band, so as to transmit to the first terminal, and the first terminal performs synthesis processing of the signal from the first base station, having the frequency for terminal communication, with the signal being received with a delay from the common base station and having the different frequency.

When the communication quality between the first base station and the first terminal becomes deteriorated, by transmitting from the common base station the identical data with a time delay using a different frequency, and by synthesizing the two identical data in the first base station or in the first terminal, an improved signal gain is obtained.

A ninth structure of the radio communication system according to the eighth structure is provided that the first base station assigns to the common base station a portion of frequencies other than the frequency for terminal communication in the first frequency band, and the different frequency is included in the portion of frequencies.

A tenth structure of the radio communication system according to the ninth system is provided that on receiving predetermined information of a deteriorated receiving condition from the first terminal, the first base station assigns the different frequency in the first frequency band to the common base station.

According to the present system, when the communication between the terminal and the base station falls into a communication impossible state, by switching the communication with the terminal to the common base station, the communication by the terminal can be continued without causing communication disconnection. Since the common base station is installed for the plurality of base stations, it becomes unnecessary to prepare redundant configuration for each base station, such as a duplicated equipment configuration, which leads to the reduction of overall system cost. Further, even when the base station falls into a communication impossible state due to the disconnection of the power or the disconnection of the communication path with the upper-level unit, etc., by operating the common base station as a substitutional communication means, the communication disconnection can be avoided, and a highly reliable radio communication system can be obtained.

BRIEF DESCRIPTION OF THE DRAWINGS

FIG. 4 is a processing flowchart for switching communication from the base station, in which abnormality has been detected, to the BTS-C;

DETAILED DESCRIPTION OF THE PREFERRED EMBODIMENTS

The preferred embodiment of the present invention is described hereinafter referring to the charts and drawings. However, it is noted that the embodiments described below do not intend to restrict the technical scope of the present invention.

The radio communication system according to the embodiment adopts a multicarrier transmission scheme [for example, OFDM (Orthogonal Frequency Division Multiplexing): including OFDMA (Orthogonal Frequency Division Multiple Access)], by which communication performed by a plurality of base stations, each located in each communication area, is carried out using subcarriers in a frequency range not overlapped between the base stations having mutually adjacent communication areas. In the multicarrier transmission scheme, data are transmitted in parallel by being divided into a plurality of subcarriers. Since a symbol period can be made longer as compared to a single carrier transmission, transmission deterioration caused by multipath can be reduced to be smaller. Further, in OFDM, which is a means to realize efficient multicarrier transmission, because the signal transmission is performed using a plurality of orthogonal subcarriers, it is possible to obtain high frequency use efficiency, and to realize high-speed transmission. The multicarrier transmission scheme (in particular, OFDM) has been put into practical use for terrestrial digital television broadcast and wireless LAN, and more recently, the application thereof to mobile communication such as mobile telephone is in progress. Particularly, in the present embodiments, explanation is made by exemplifying a radio communication system to be applied to WiMAX (Worldwide Interoperability for Microwave Access) which is one standard for high-speed wireless data communication. Additionally, WiMAX (including Mobile WiMAX) has been standardized as IEEE 802.16. The application of the present radio communication system is not limited to WiMAX, but is also applicable to a radio communication system in a wireless network standardized by 3GPP (the 3rd Generation Partnership Project) or the like.

Figure 1A:
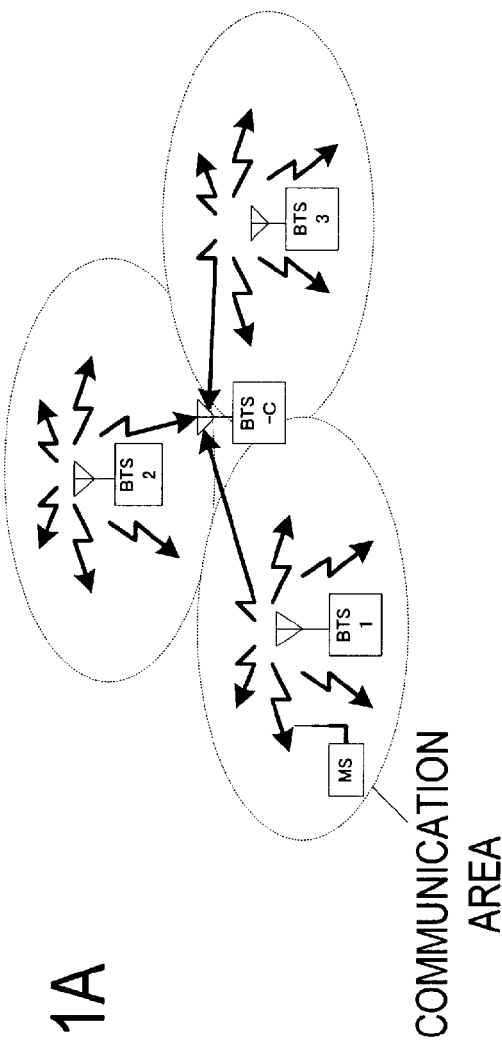
FIG. 1 is a diagram illustrating an exemplary configuration of a radio communication system according to the embodiment.
Figure 1B:
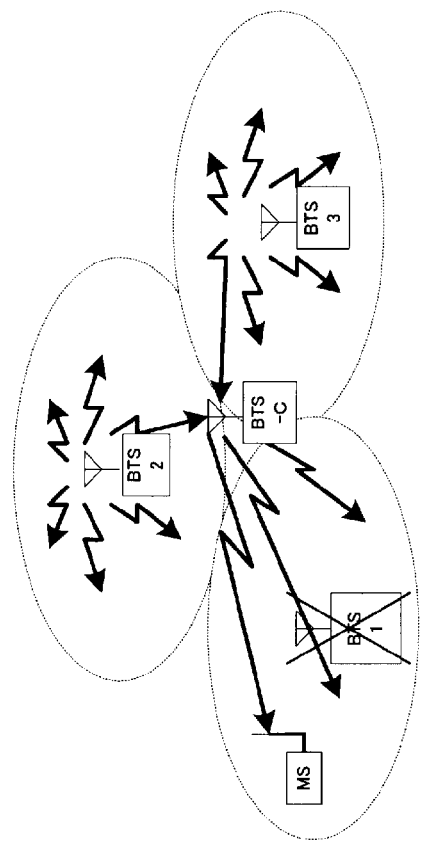

FIG. 1 is a diagram illustrating an exemplary configuration of a radio communication system according to the embodiment. The radio communication system includes a common base station (BTS-C) communicable with each communication area of the plurality of BTS (FIG. 1A), in addition to a plurality of base stations (BTS) each located in each communication area. In place of a base station BTS which becomes a communication impossible state with a terminal in the communication area, the BTS-C communicates with the terminal MS in the communication area concerned (FIG. 1B). The BTS-C is located to have a communicable area of the communication areas of, for example, three base stations: BTS1, BTS2 and BTS3. As shown in the figure, ideally, the BTS-C is located at a position having a substantially equal distance from each base station BTS1, BTS2, BTS3 (in the vicinity that the end area of each base station BTS1, BTS2, BTS3 is adjacent). By making transmission power of the BTS-C greater than the transmission power of each base station, communication with each BTS communication area is made possible. Hereafter, the present embodiment describes a case that the area covered by the BTS-C is set to be the areas of the three base stations. However, the number of the covered areas (communicable base stations) is not limited to three, and the number of two, four or more may be possible.

Figure 2:
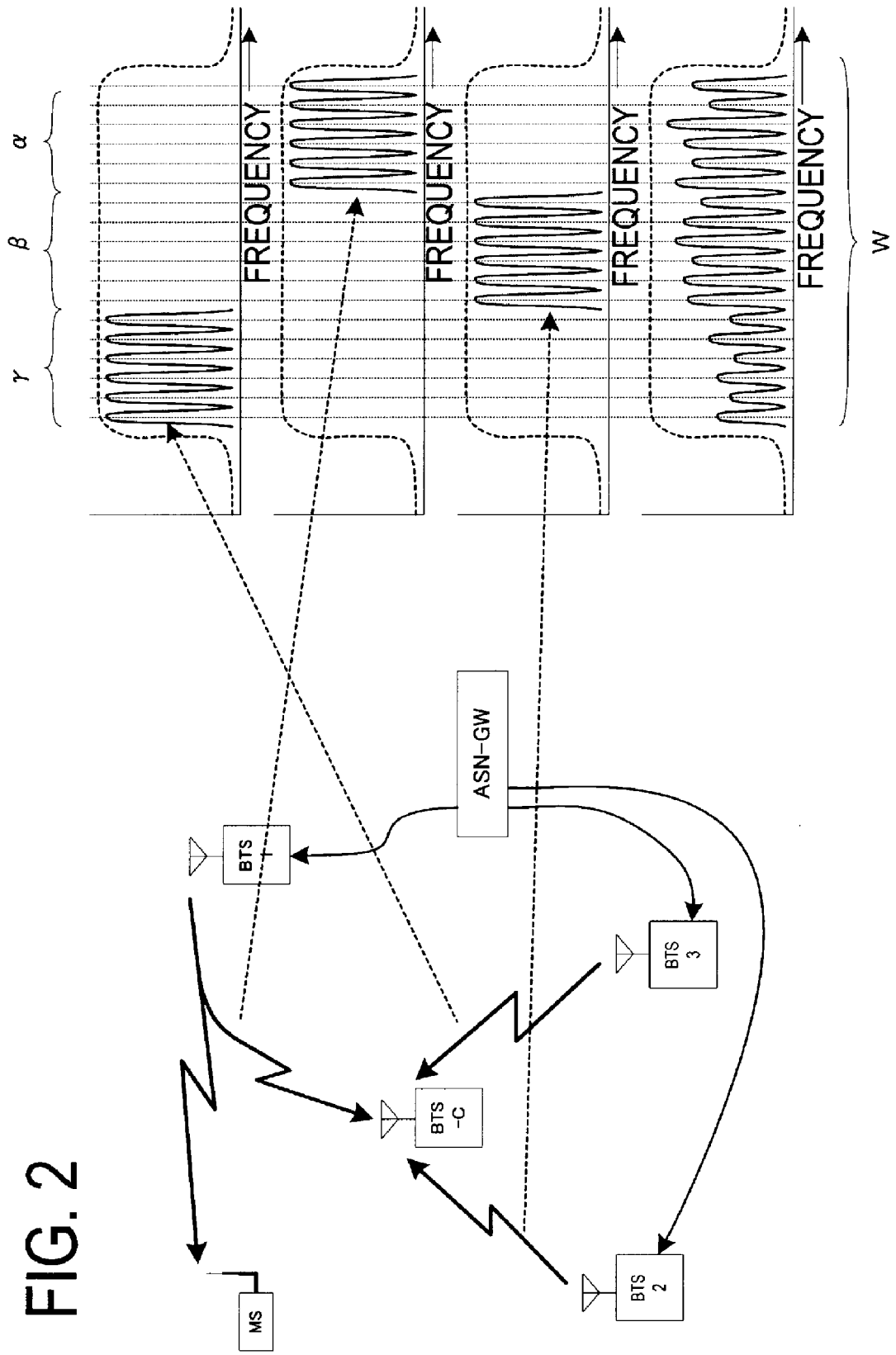
FIG. 2 is a diagram illustrating subcarrier signals of each base station BTS1, BTS2, BTS3.

FIG. 2 is a diagram illustrating subcarrier signals of each base station BTS1, BTS2, BTS3. The common base station BTS-C supervises the subcarrier signal from each base station located in the area with which the BTS-C is communicable. Specifically, the BTS-C receives radio waves being used to communicate with terminals. To each base station (BTS), there is assigned a subcarrier having a mutually different frequency. The subcarrier frequency used in each base station differs from the subcarrier signal frequency of a base station adjacent to the above each base station. For example, when a frequency range W is used by the base stations BTS1, BTS2 and BTS3, there are assigned a frequency range α to the BTS1, a frequency range γ to the BTS2, and a frequency range β to the BTS3. The BTS-C identifies each base station by each received radio wave frequency, and also detects the existence or non-existence of abnormality in each base station.

The BTS-C detects, for example, the electric field intensity (RSSI value) of each subcarrier signal, and decides a base station which corresponds to a subcarrier signal, whose electric field intensity is not detected, to be abnormal. It is also possible to discriminate the existence or non-existence of abnormality of the subcarrier signal by processing Fast Fourier transform (FFT) on the received subcarrier signal, extracting map information and confirming data normality.

Also, each base station BTS1, BTS2, BTS3 is connected by wire to an ASN-GW (Access Service Network-Gateway), which is an upper-level unit to the base stations. The ASN-GW provides such functions as auxiliary authentication, radio resource management, transmission resource management, handover, location update, authentication management, and charging information.

Figure 3A:
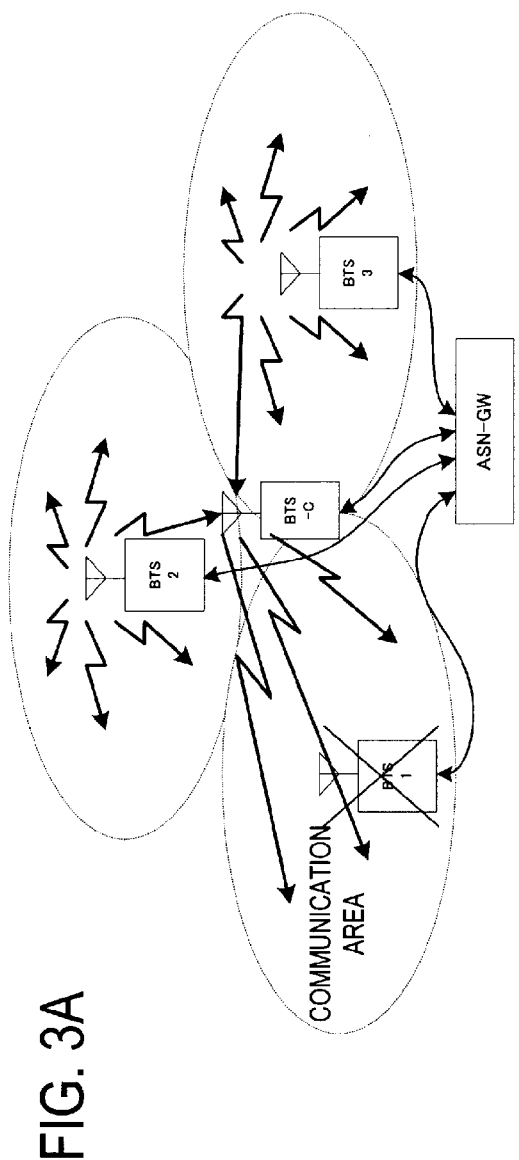
FIG. 3 is a diagram illustrating communication between the common base station BTS-C and the upper-level unit ASN-GW.

FIG. 3 is a diagram illustrating communication between the common base station BTS-C and the upper-level unit ASN-GW. When the BTS-C detects abnormality in one of the base stations in the area covered by the BTS-C (BTS1 in FIG. 3), the BTS-C notifies the ASN-GW of the above detection. In order to enable the BTS-C to communicate with the terminals existent in the above abnormal base station area in place of the abnormal base station, the ASN-GW is required to newly allocate to the BTS-C the radio resources having been allocated to the abnormal base station.

Figure 3B:
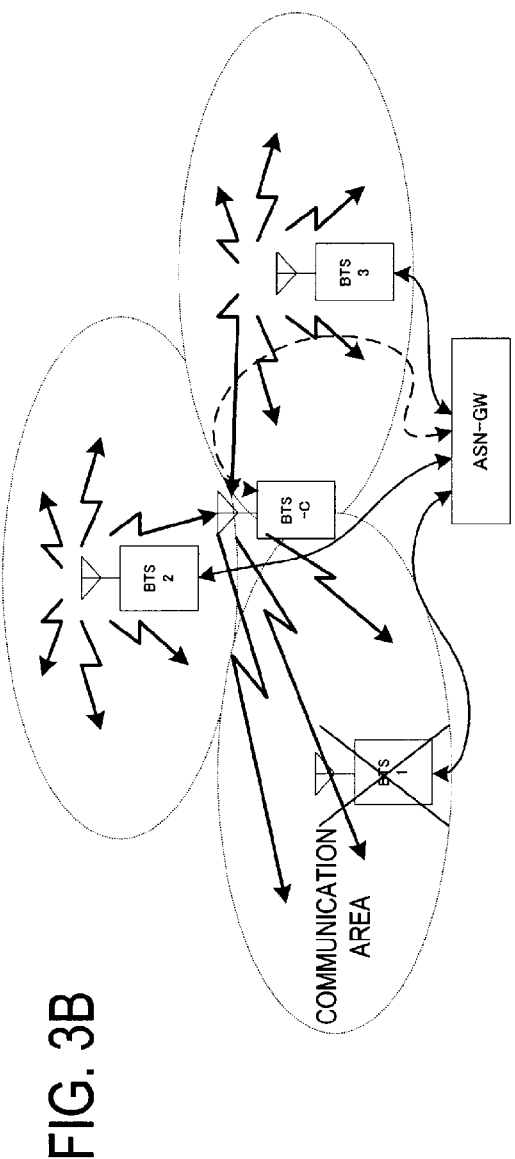

Since a proprietary frequency is not assigned to the BTS-C, when communication with the ASN-GW is to be performed, there are considered a method of enabling communication by directly connecting the BTS-C to the ASN-GW by wire (FIG. 3A), and a method of communicating with the ASN-GW via a base station other than the base station concerned (FIG. 3B). In case of direct connection to the ASN-GW by wire, the BTS-C can communicate with the ASN-GW through wire without need of assigning a subcarrier frequency for use in the radio communication with other normal base stations. In case of communication via another normal base station, the BTS-C establishes a call with the other base station using a message on the terminal side, in the known call establishment request sequence from the terminal to the base station, and then communicates with the ASN-GW via the other normal base station which acts as relay base station.

FIG. 4 is a processing flowchart for switching communication from the base station, in which abnormality has been detected, to the BTS-C. In FIG. 4, there is shown an exemplary case that the abnormality occurs in the BTS1, and the BTS-C notifies the ASN-GW of the occurrence of abnormality, via the BTS2 acting as relay base station.

In the BTS1, on the occurrence of abnormality such as suspension of radio wave transmission or transmission of an abnormal radio wave (S101), the terminal MS in the area of the BTS1 becomes impossible to communicate with the BTS1 (S102), and the BTS-C detects the abnormality of the BTS1 (S103). The BTS-C selects the BTS2 from among other normal base stations, and establishes a call with the BTS2 using a call establishment request sequence, and notifies the BTS2 of the abnormality having occurred in the BTS1 (S104). The BTS2 relays the received notification of the BTS1 abnormality (S105). Namely, the BTS2 transmits the received notification of the BTS1 abnormality to the ASN-GW. On receiving the notification of the occurrence of the BTS1 abnormality, the ASN-GW suspends the communication function of the BTS1 (S106).

Further, after transmitting the notification of the BTS1 abnormality, the BTS-C transmits a substitutional communication request, requesting communication with the terminals in the BTS1 area by taking the place of the BTS1, to the ASN-GW via the BTS2 (S107, S108).

On receiving the substitutional communication request from the BTS-C, the ASN-GW notifies the BTS2 of a relay indication for indicating the BTS2 to relay the communication between the BTS-C and the ASN-GW when the BTS-C starts the substitutional communication with the terminal MS (S109). The relay indication includes subcarrier frequency information to be used by the BTS-C. The subcarrier frequency for use by the BTS-C is a frequency range α having been assigned to the BTS1.

On receiving the relay indication, the BTS2 divides the frequency range α assigned to the BTS-C into a frequency range (α1) for use in the communication between the BTS-C and the BTS2, and a frequency range (α2) for use between the BTS-C and the terminal MS (S110). The processing shown in FIG. 4 is an exemplary case that the communication between the BTS-C and the ASN-GW is carried out via the BTS2, without the provision of a direct connection with the ASN-GW by wire. Therefore, the BTS-C has to perform radio communication with both the terminal MS and the BTS2. By dividing the assigned frequency range, it is possible to perform simultaneous communication with the terminal MS and the BTS2.

Figure 5:
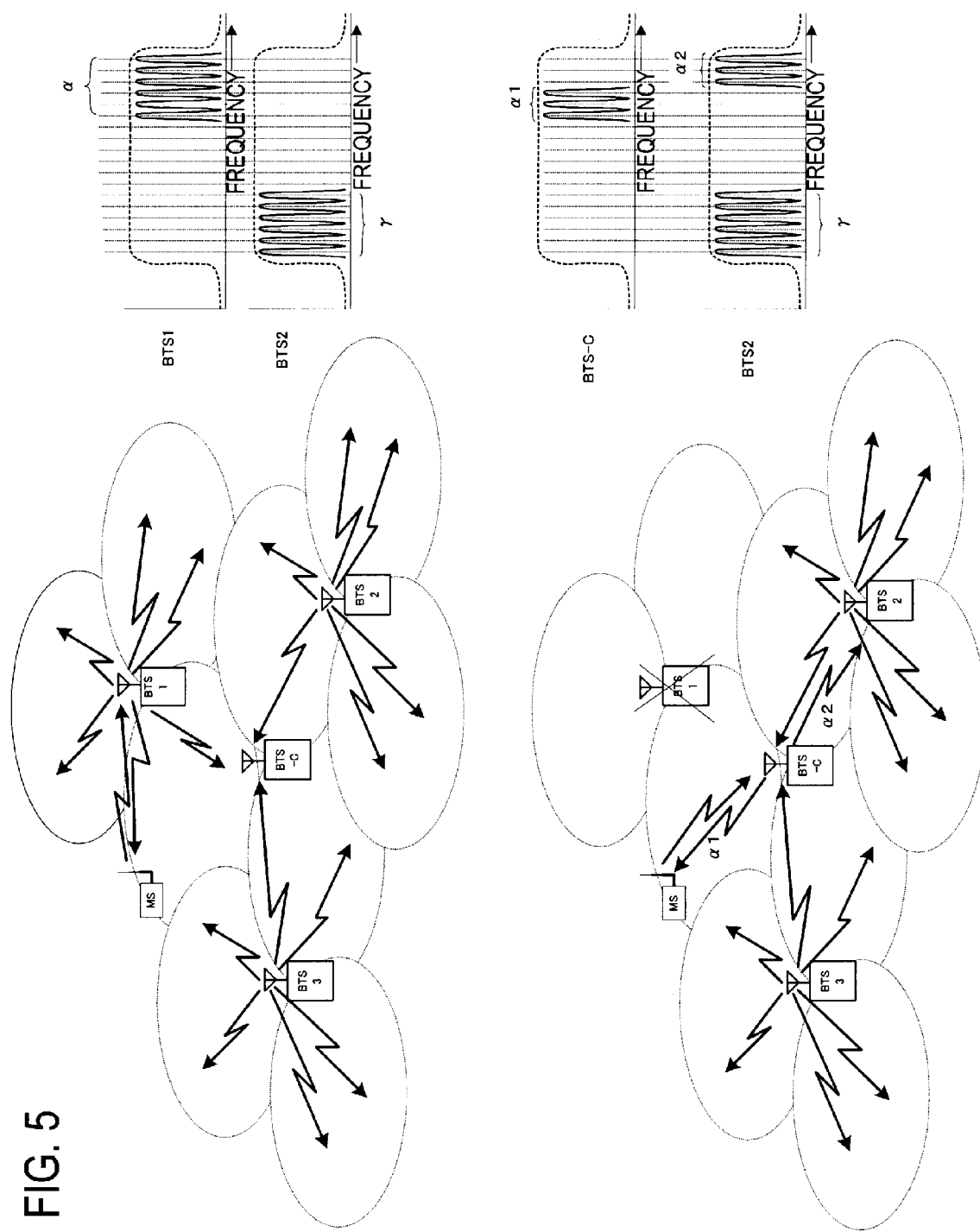
FIG. 5 is a diagram illustrating the division of the frequency range.

FIG. 5 is a diagram illustrating the division of the frequency range. FIG. 5A shows an assigned frequency range in a normal state in which no abnormality has occurred in the BTS1. A frequency range α is assigned to the BTS1 for the communication with the terminal MS, and also a frequency range γ is assigned to the BTS2. FIG. 5B shows an assigned frequency range when abnormality has occurred in the BTS1, and the BTS2 works as a relay base station of the BTS-C, in which a frequency range α1 is assigned for the communication between the BTS-C and the terminal MS among the frequency range α assigned to the BTS1, and a frequency range α2 is assigned for the communication between the BTS-C and the BTS2. A frequency range γ originally assigned to the BTS2 is used intact for the communication with the terminals in the BTS2 area.

Referring back to FIG. 4, when the BTS2 transmits a communication permission notification to the ASN-GW (S111), the ASN-GW specifies a subcarrier frequency f1 from among the frequency range α1, for the communication between the BTS2 and the BTS-C. Also the ASN-GW specifies a subcarrier frequency f2 from among the frequency range α2, for the communication between the terminal MS and the BTS-C (S112). The ASN-GW notifies the BTS2 of the above specification. Through the communication between the BTS2 and the BTS-C using the specified frequency f1, the BTS2 notifies the BTS-C of the specified frequencies f1, f2, through the communication between the BTS2 and the BTS-C using the specified frequency f1 (S113). The BTS-C converts a received signal into the specified frequency f2 between the terminal MS and the BTS-C (S114), and notifies the terminal MS of the specified frequency f2 between the terminal MS and the BTS-C (S115). Then, the terminal MS starts communication with the BTS-C, using the specified frequency f2 (S116). Additionally, the terminal MS transmits a signal using the specified frequency f2. On receipt of the signal from the terminal MS, the BTS-C converts into a signal having the specified frequency f1, so as to transmit to the BTS2.

As such, when a failure occurs in the BTS1 during the communication with the terminal MS, by switching over the communication with the terminal MS to the BTS-C, a radio communication system preventing the occurrence of communication disconnection is achieved. Since the BTS-C is installed for the plurality of base stations, it becomes unnecessary for each base station to have a redundant configuration, such as duplicated equipment configuration. This leads to the reduction of overall system cost. Further, even when the overall base station falls into a communication impossible state due to power disconnection or the disconnection of a communication path to the upper-level unit, by operating the BTS-C as a substitutional communication means, communication disconnection can be avoided, and a highly stable radio communication system can be achieved.

Figure 6:
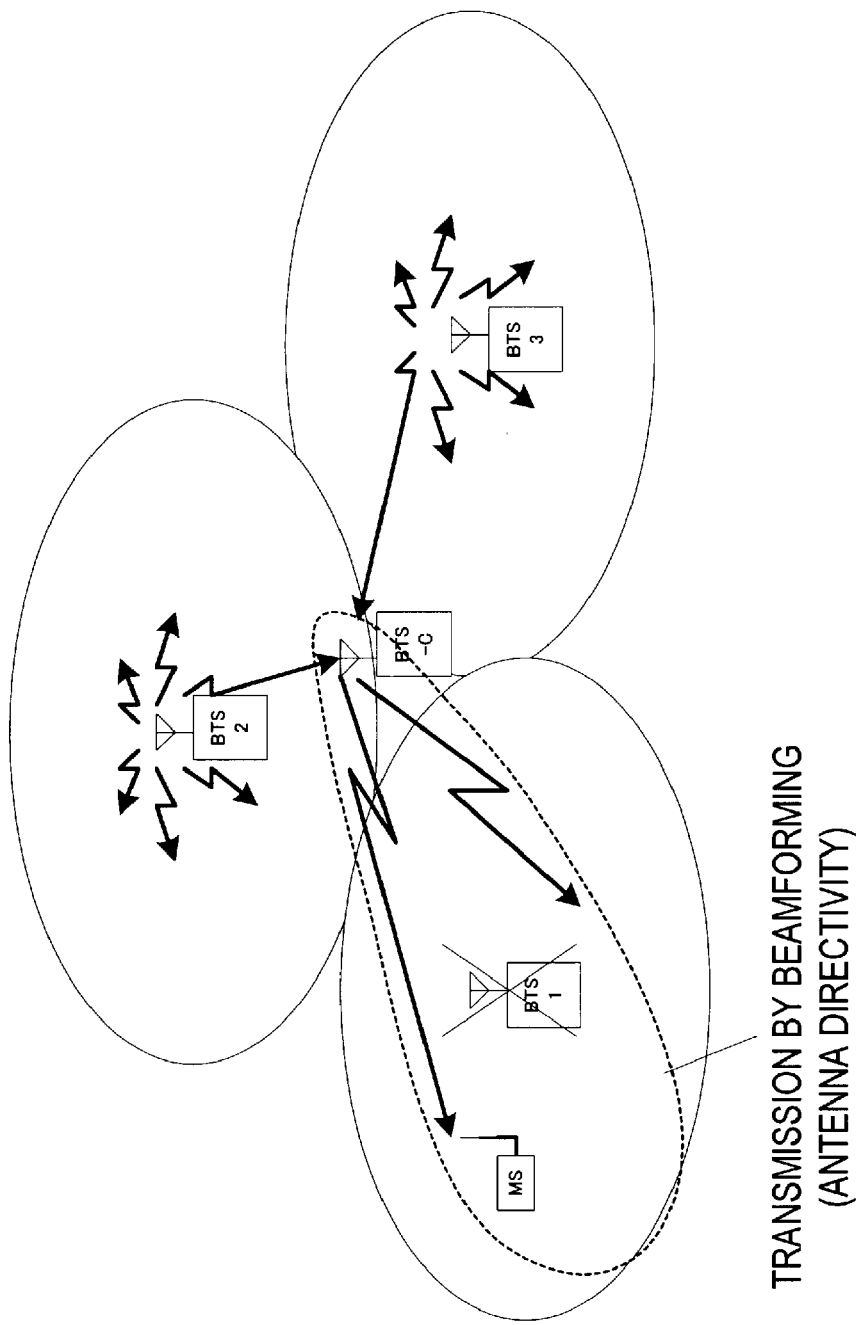
FIG. 6 is a diagram illustrating a first example of an antenna of the BTS-C.

FIG. 6 is a diagram illustrating a first example of an antenna of the BTS-C. For example, using the known beamforming (including digital beamforming), directivity is provided in the BTS-C antenna. By providing strong directivity to the BTS-C area in which communication has become impossible due to the occurrence of abnormality, frequency interference to other communication areas can be restrained. Although different frequency ranges are assigned to mutually adjacent areas, in the area that the radio wave from the BTS-C reaches, there may be a case of overlapping with the frequency range for the adjacent area, depending on a communication area set condition. Therefore, it is preferable to provide antenna directivity to restrict a radio wave propagation area. In the present case, the BTS-C antenna directivity is set to be communicable with the communication area of the BTS1.

Figure 7:
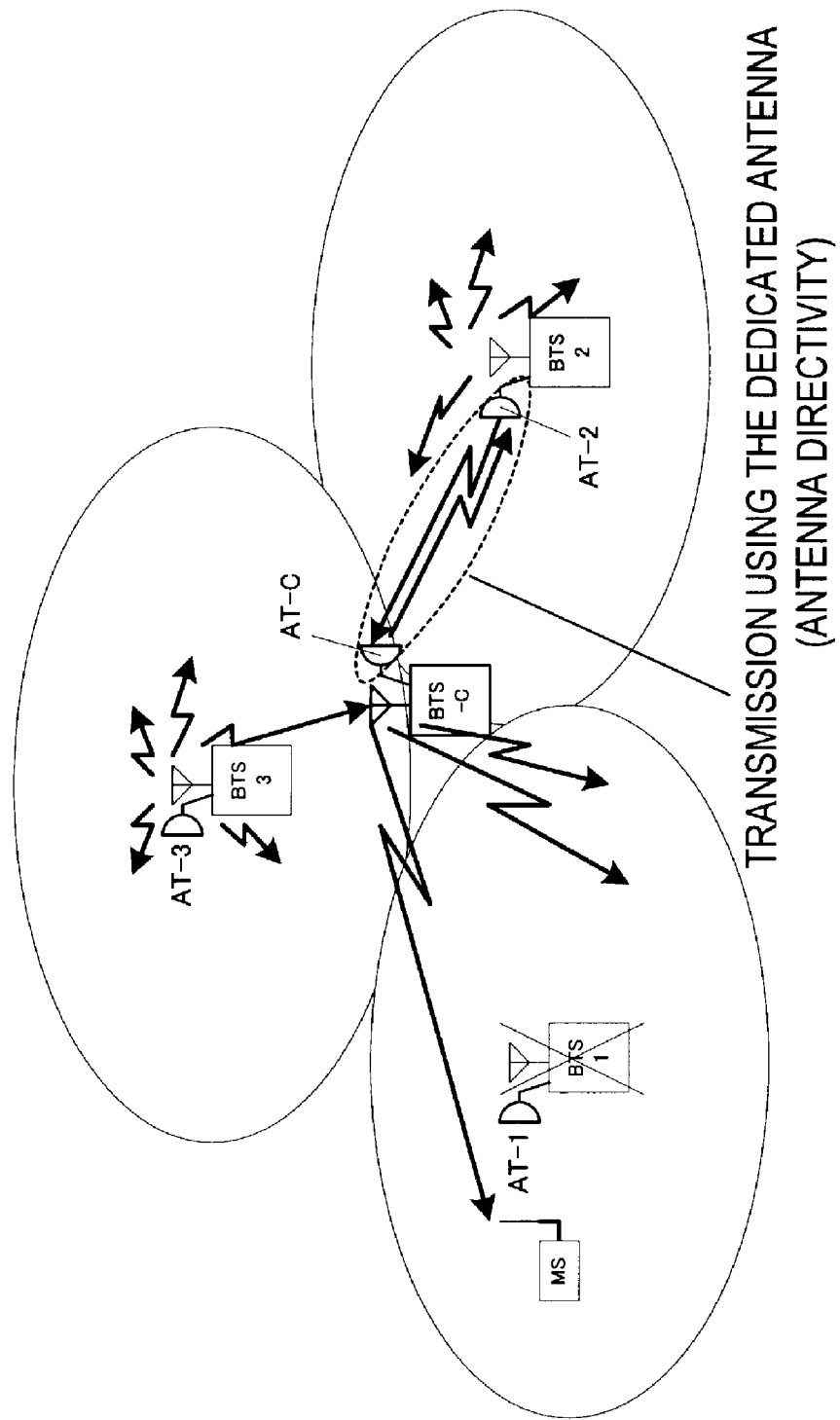
FIG. 7 is a diagram illustrating a second example of the BTS-C antenna.

FIG. 7 is a diagram illustrating a second example of the BTS-C antenna. In addition to an ordinary antenna for communicating with terminals in each area, when working as relay base station, each base station BTS1, BTS2, BTS3 has each dedicated antenna AT-1, AT-2, AT-3 to communicate with the BTS-C. The BTS-C also has a dedicated antenna AT-C to communicate with one dedicated antenna (any one of AT-1, AT-2, AT-3) of the base station which works as relay base station, in addition to an ordinary antenna to supervise the radio wave from each base station and to communicate with terminals in case of performing substitutional communication.

As such, by providing the dedicated antenna for relay in each base station and the BTS-C, the base stations working as relay base stations and the common base station BTS-C can communicate between each base station and the BTS-C, without affecting ordinary communication with the terminals, so as to contribute to stabilized communication. Further, by providing the aforementioned dedicated antennas, it becomes also possible to adopt a modulation scheme different from the modulation scheme (OFDM in this case) for use in the ordinary communication with the terminals. For example, it is also possible to relay using a communication scheme like CDMA. In this case, since a dedicated bandwidth is provided for the relay, the entire frequency range being assigned can be used for the communication with the terminals, without dividing the frequency range having been assigned to the BTS in which a failure has occurred, as described earlier.

Figure 8:
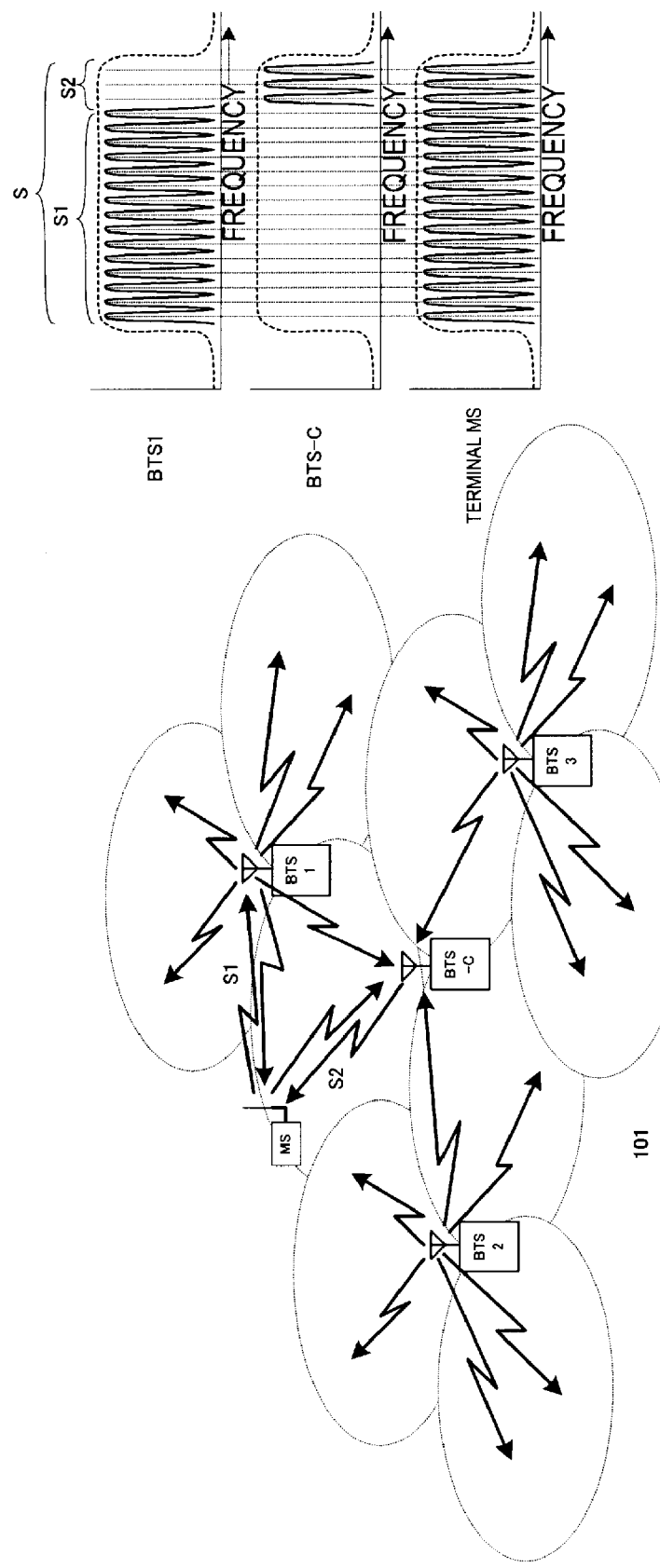
FIG. 8 is a diagram illustrating another function of the BTS-C.

FIG. 8 is a diagram illustrating another function of the BTS-C. For example, when the terminal MS is communicating with the BTS1, and when the communication quality thereof becomes deteriorated (for example, when the radio wave reception level from the base station falls below a predetermined value, or when the number of retransmission times exceeds a predetermined number of times set in advance), in order to improve the communication quality, the BTS-C transmits an identical data to the terminal MS in duplication. The above-mentioned transmission is realized by transmitting the identical data with a differentiated time using a different subcarrier, in addition to the direct communication between the terminal MS and the BTS1 using a preset subcarrier. Also, with regard to a signal to be transmitted from the terminal MS to the BTS1, the BTS-C transmits the signal after converting to a different subcarrier. The BTS1 receives the signal transmitted from the terminal MS directly from the terminal MS, as well as the signal transmitted from the BTS-C with a time delay, using the other subcarrier.

Specifically, the BTS1 assigns to the BTS-C a subcarrier of a predetermined frequency S2, among assigned subcarrier frequencies S. The subcarrier of the frequency S2 for the BTS-C may be one subcarrier or a plurality of subcarriers. The one or the plurality of subcarriers grouped for the BTS-C constitute a subchannel. Additionally, the subcarrier frequency S1 already used for the communication with the terminal MS is included in the remaining frequency range. In order to supervise each base station, the BTS-C receives the subcarrier signal of the frequency S1 destined to the terminal MS. On receiving the subcarrier signal of the frequency S1, the BTS-C converts the received signal to the subcarrier signal having the frequency S2, so as to transmit. The transmission timing of the subcarrier signal of the frequency S2 has a delay equal to a relay processing time in the BTS-C, from the subcarrier signal of the frequency S1.

The terminal MS receives a subcarrier signal of the frequency S1 from the BTS1, and with a delay therefrom, receives a subcarrier signal of the frequency S2 from the BTS-C. Here, the terminal MS can communicate using the entire frequency ranges (S1+S2). The terminal MS can increase a signal gain and improve the communication quality by synthesizing the subcarrier signal of the frequency S1 with the subcarrier signal of the frequency S2 by means of maximum ratio synthesis processing etc. With regard to the BTS1 also, the signal gain can be improved by synthesizing the subcarrier signal of the frequency S1 from the terminal MS with the subcarrier signal of the frequency S2 from the BTS-C. Namely, there is achieved time diversity in which an identical data is transmitted for a plurality of times with a time lag. The BTS-C may include the above function of transmitting identical data in a different subcarrier with a time delay, together with a function of substitutional communication of the base station having abnormality. Alternatively, the BTS-C may execute either one function only.

Figure 9:
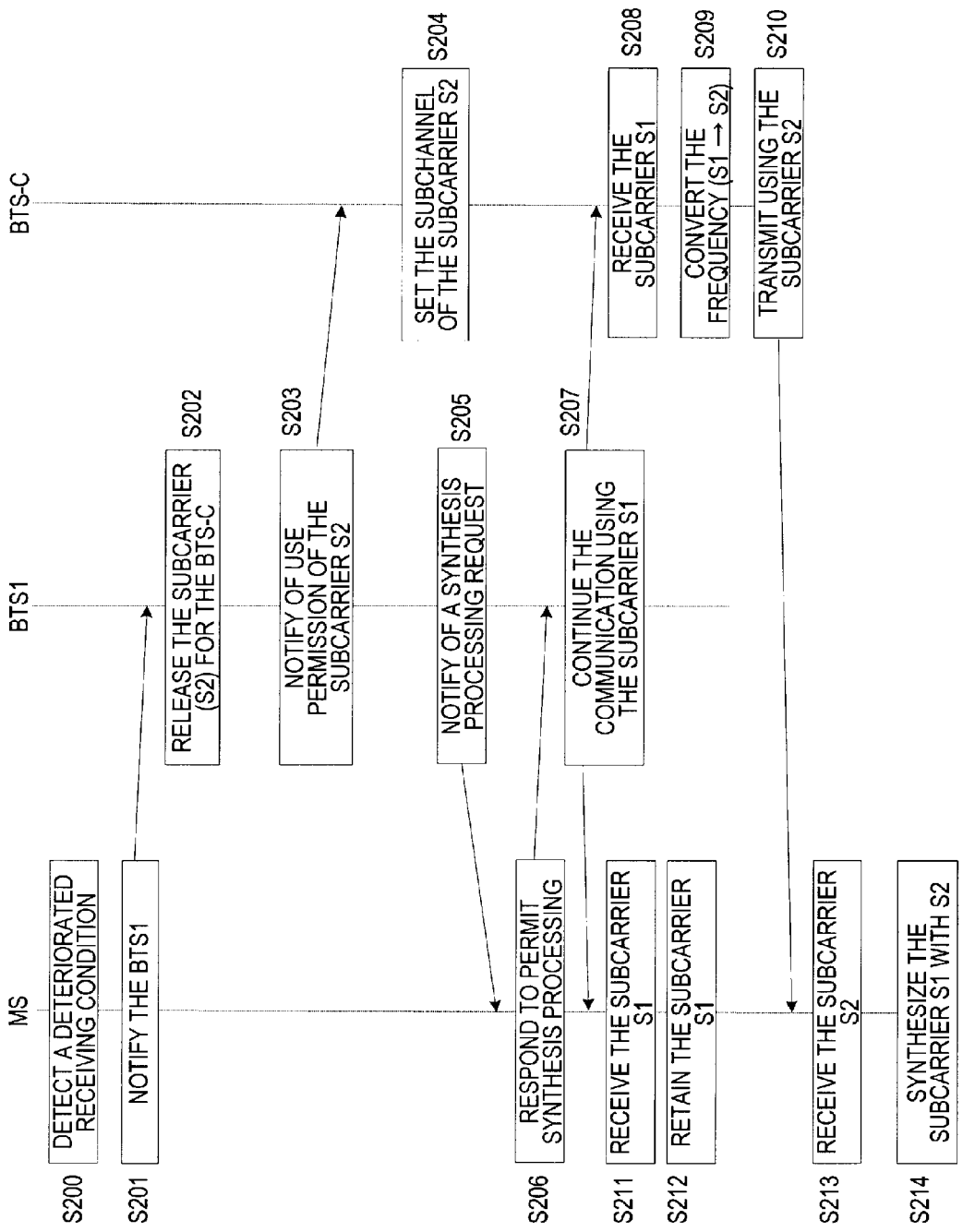
FIG. 9 is a processing flowchart in which a signal from a base station to a terminal is transmitted from the BTS-C using a different subcarrier.

FIG. 9 is a processing flowchart in which a signal from a base station to a terminal is transmitted from the BTS-C using a different subcarrier. In FIG. 9, there is shown an exemplary case that the communication quality between the BTS1 and the terminal MS using the subcarrier of the frequency S1 is deteriorated, and that the BTS-C transmits the signal to be transmitted from the BTS1, using the different subcarrier.

The terminal MS detects the deterioration of a signal receiving condition from the BTS1 (S200). The deteriorated receiving condition is decided from a case that the electric field intensity falls down to a predetermined level or lower, or a case that the number of retransmission times in a certain time period exceeds a predetermined number of times. On detecting the deteriorated receiving condition, the terminal MS notifies the BTS1 of the above deterioration (S201).

On receipt of the above notification of the deteriorated receiving condition from the terminal MS, the BTS1 reduces the transmission capacity, and releases the subcarrier (subchannel) for the assignment to the BTS-C (S202). The frequency S2 of the subcarrier for the BTS-C is fixed in advance, and when the notification of the deteriorated receiving condition is received, the subcarrier of the frequency S2 is released. Subsequently, the BTS1 transmits to the BTS-C a use permission notification of the released frequency S2 (S203). The BTS-C sets the subchannel of the frequency S2 (S204).

Also, the terminal MS receives the subcarrier signal of the frequency S2 with a time delay from the reception of the subcarrier signal of the frequency S1. Accordingly, the BTS1 transmits a request notification of synthesis processing, requesting the terminal MS to perform maximum ratio synthesis processing with the subcarrier signal of the frequency S1, after receiving the subcarrier signal of the frequency S2 (S205). The terminal MS makes a permission response to the request notification of synthesis processing (S206).

The BTS1 releases the subchannel of the frequency S2, and continues communication with the terminal MS, using the subcarrier signal of the frequency S1, while continuing communication between the BTS-C and the terminal MS in regard to the use of the frequency S2 (S207).

On receiving the subcarrier signal of the frequency S1 destined to the terminal MS (S208), the BTS-C converts the received subcarrier signal to a subcarrier signal of the frequency S2 (S209), and transmits (S210).

On receipt of the subcarrier signal of the frequency S1 (S211), the terminal MS tentatively stores the received signal into a predetermined storage means (S212). Thereafter, on receipt of the subcarrier signal of the frequency S2 (S213), the terminal MS performs synthesis processing of the retained subcarrier signal of the frequency S1 with the subcarrier signal of the frequency S2 (S214).

Figure 10:
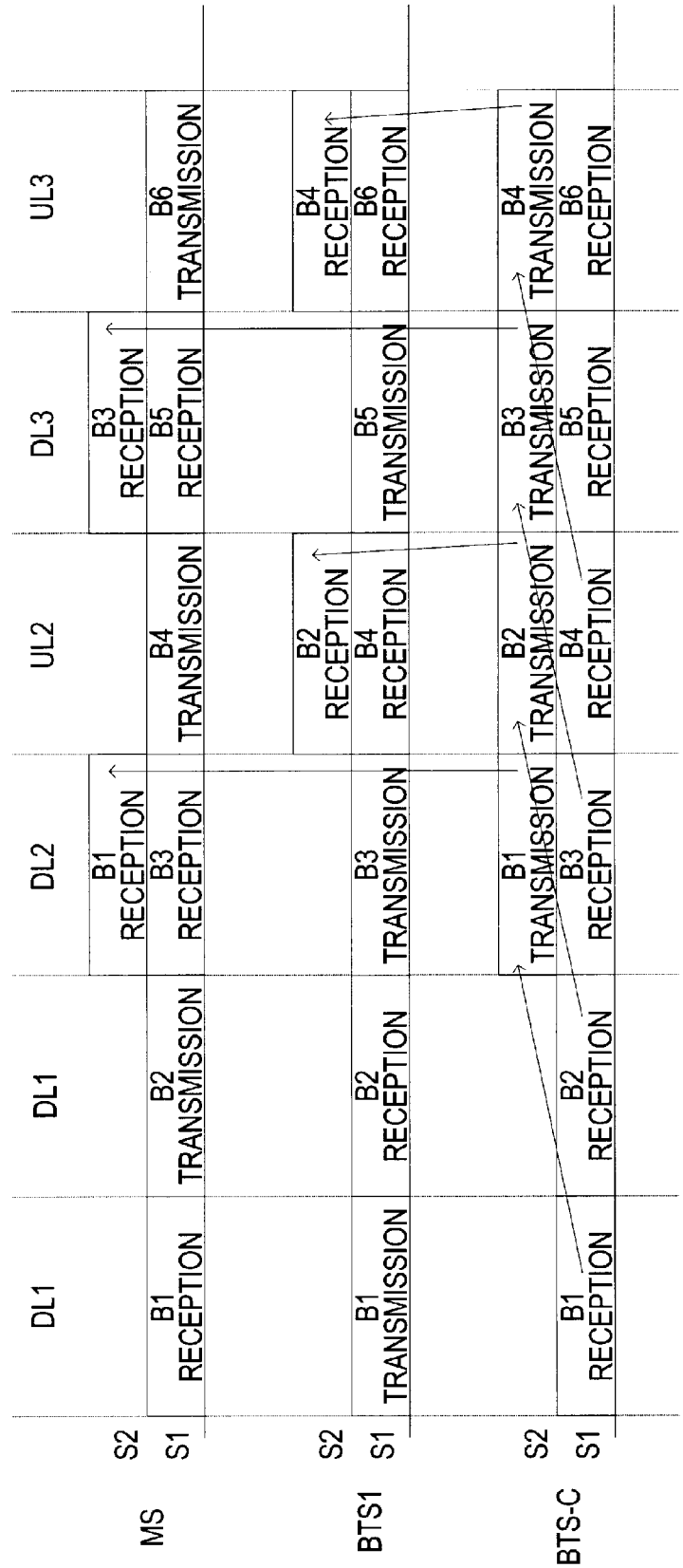
FIG. 10 is a time chart illustrating the transmission and reception timing with regard to the subcarrier signal of the frequency S1 and the subcarrier signal of the frequency S2.

FIG. 10 is a time chart illustrating the transmission and reception timing with regard to the subcarrier signal of the frequency S1 and the subcarrier signal of the frequency S2. FIG. 10 shows an exemplary case of communication using the TDD (Time Division Duplex) scheme. Namely, the BTS1 and the terminal MS perform communication by switching the transmission and the reception at high speed on the time axis, using the identical frequency S1. In a downlink (DL) period, the BTS1 is the transmitting side and the terminal MS is the receiving side. In an uplink (UL) period, the terminal MS is the transmitting side and the BTS1 is the receiving side. On the other hand, the BTS-C can receive and transmit in the both periods of the DL period and the UL period.

In a downlink period DL1, when the BTS1 transmits a data B1 using the subcarrier signal of the frequency S1, the terminal MS and the BTS-C receive the data B1, and store the received data into each storage means. In an uplink period UL1, the terminal MS transmits a data B2 using the subcarrier signal of the frequency S1. Then, the BTS1 and the BTS-C receive the data B2, and store the received data into each storage means.

Subsequently, in the next downlink period DL2, the BTS1 transmits a data B3 using the subcarrier signal of the frequency S1, and the BTS-C transmits the data B1 having been received in the downlink period DL1, using the subcarrier signal of the frequency S2. Accordingly, the terminal MS receives the data B3 of the frequency S1 and the data B1 of the frequency S2. Namely, the terminal MS receives the data B1 in the downlink period DL1, as the subcarrier signal of the frequency S1, and also receives the above data B1 in the next downlink period DL2, as the subcarrier signal of the frequency S2. Thereafter, the terminal MS stores the data B3 of the frequency S1 into the storage means. Then, the terminal MS reads out the data B1 stored in the storage means, so as to perform synthesis processing with the received data B1 of the frequency S2. In addition, the BTS-C also receives the data B3 of the frequency S1.

In the next uplink period UL2, the terminal MS receives a data B4 using the subcarrier signal of the frequency S1. Also, the BTS-C transmits the data B2 received in the uplink period UL1, using the subcarrier signal of the frequency S2. Accordingly, the BTS1 receives both the data B4 of the frequency S1 and the data B2 of the frequency S2. Namely, the BTS1 receives the data B2 in the uplink period UL1, as the subcarrier signal of the frequency S1, and also receives the above data B2 in the next uplink period UL2, as the subcarrier signal of the frequency S2. Then, the BTS1 stores the data B4 of the frequency S1 into the storage means. The BTS1 also reads out the data B2 stored in the storage means, so as to perform synthesis processing with the received data B2 of the frequency S2. In addition, the BTS-C also receives the data B4 of the frequency S1.

Similarly, in the downlink period DL3 and thereafter, the terminal MS receives the identical data to the data received in the preceding downlink period, as the subcarrier signal of the different frequency. Also, in the uplink period UL3 and thereafter, the BTS1 receives the identical data to the data received in the preceding uplink period, as the subcarrier signal of the different frequency. Accordingly, in a state of deteriorated communication quality, by receiving the identical data with different timing for a plurality of times and synthesizing, the data gain can be improved, and the communication quality can be restored. When the terminal MS is moving, because the radio wave condition changes as the change of time, by transmitting and receiving the identical data for a plurality of times with different timing, an improved gain due to an improved radio wave condition can be expected, in addition to the improved gain obtained by the synthesis processing.

Although the time chart based on the TDD scheme is shown in FIG. 10, it is not limited to the TDD scheme. The present invention is applicable to the FDD scheme, in which different frequencies are used in the downlink and the uplink without time division. Namely, with regard to the downlink and the uplink, different frequencies are assigned for the BTS-C, and using the respective frequencies, a data identical to the data received in the BTS-C from the terminal MS (or the BTS1) is transmitted to the BTS1 (or the terminal MS) with delayed timing from the receiving timing.

What is claimed is:

1. A radio communication system comprising:
   a first base station having a first communication area, and performing radio communication with a first terminal in the first communication area using a first frequency band;
   a second base station having a second communication area adjacent to the first communication area, and performing radio communication with a second terminal in the second communication area using a second frequency band different from the first frequency band; and
   a common base station capable of radio communication with the first base station, the second base station, the first terminal and the second terminal,
   wherein the common base station receives radio output signals from the first base station and the second base station, and performs a radio communication with the first terminal using the first frequency band based on conditions of the received radio output signals, and
   wherein the common base station performs radio communication with the second base station, using a frequency in the first frequency band, being different from the frequency for terminal communication provided for communicating with the first terminal.

2. The radio communication system according to claim 1, further comprising:
   a gateway device connected by wire with the first base station and the second base station, and
   wherein the second base station relays a signal, which is to be transmitted from the common base station and destined to the gateway device, to the gateway device, and also relays a signal, which is to be transmitted from the gateway device and destined to the common base station, to the common base station.

3. The radio communication system according to claim 2, wherein the common base station converts a signal received from the second base station using the different frequency into a signal having the frequency for terminal communication, so as to transmit to the terminal, and also converts a signal received from the terminal using the frequency for terminal communication, so as to transmit to the second base station.

4. The radio communication system according to claim 1, further comprising:
   a gateway device connected by wire to the first base station, the second base station and the common base station.

5. The radio communication system according to claim 1, wherein the common base station includes an antenna having directivity in an output signal, and when performing radio communication with the first terminal, outputs a signal having stronger directivity to the direction of the first terminal than to other directions.

6. The radio communication system according to claim 1, wherein the common base station includes an antenna for performing radio communication with at least the first terminal in the first communication area and the second terminal in the second communication area, and an antenna for communicating with the second base station, and
wherein the second base station includes an antenna for performing radio communication with at least the second terminal in the second communication area, and an antenna for communicating with the common base station.

7. The radio communication system according to claim 1, wherein, on receiving a signal from the second base station to the second terminal using the frequency for terminal communication in the second frequency band, the common base station converts the signal into a frequency in the second frequency band, which is different from the frequency for terminal communication, so as to transmit to the second terminal, and the second terminal performs synthesis processing of the signal from the second base station, having the frequency for terminal communication, with the signal from the common base station having the different frequency.

8. A radio communication system comprising:
a first base station having a first communication area, and performing radio communication with a first terminal in the first communication area using a first frequency band;
a second base station having a second communication area adjacent to the first communication area, and performing radio communication with a second terminal in the second communication area, using a second frequency band different from the first frequency band; and
a common base station capable of radio communication with the first base station, the second base station, the first terminal and the second terminal,
wherein, on receiving a signal from the first base station destined to the first terminal using the frequency for terminal communication in the first frequency band, the common base station converts the signal to a frequency different from the frequency for terminal communication in the first frequency band, so as to transmit to the first terminal, and the first terminal performs synthesis processing of the signal from the first base station, having the frequency for terminal communication, with the signal being received with a delay from the common base station and having the different frequency.

9. The radio communication system according to claim 8, wherein the first base station assigns to the common base station a portion of frequencies other than the frequency for terminal communication in the first frequency band, and the different frequency is included in the portion of frequencies.

10. The radio communication system according to claim 9, wherein, on receiving predetermined information of a deteriorated receiving condition from the first terminal, the first base station assigns the different frequency in the first frequency band to the common base station.

* * * * *